United States Patent [19]
Gill

[11] Patent Number: 5,103,619
[45] Date of Patent: Apr. 14, 1992

[54] DISPOSAL OF EMPTY CONTAINERS

[75] Inventor: David C. Gill, Bristol, United Kingdom

[73] Assignee: Nomix Manufacturing Company Limited, United Kingdom

[21] Appl. No.: 579,808

[22] Filed: Sep. 10, 1990

[30] Foreign Application Priority Data

Sep. 18, 1989 [GB] United Kingdom ............... 8921102

[51] Int. Cl.⁵ .......................... B65B 5/04; B65B 67/00
[52] U.S. Cl. ........................................ 53/438; 53/468; 53/471
[58] Field of Search ....................... 53/381.4, 492, 468, 53/175, 467, 469, 471, 473, 436, 429, 430, 438; 29/403.3, 403.1

[56] References Cited

U.S. PATENT DOCUMENTS

| | | | |
|---|---|---|---|
| 3,299,606 | 1/1967 | Weikert | 53/381.4 X |
| 4,324,088 | 4/1982 | Yamashita et al. | 53/527 |
| 4,592,192 | 6/1986 | Jacob et al. | 53/512 |
| 4,658,989 | 4/1987 | Bonerb | 53/175 X |

FOREIGN PATENT DOCUMENTS 0092164 4/1983 European Pat. Off.
2136781 9/1984 United Kingdom.

Primary Examiner—James F. Coan
Attorney, Agent, or Firm—Merchant, Gould, Smith, Edell, Welter & Schmidt

[57] ABSTRACT

Containers of the type having a rigid outer casing 4 accommodating an inner liner 2 are disposed of by removing the outer casing 4, expelling air remaining in the liner 2, and placing the liner 2 in a waste receptacle 10. The casing 4 is disposed of separately. When full, the waste receptacle 10 is disposed of in its entirety by means appropriate to the nature of the former contents of the containers. For example, disposal of the receptacle 10 may be undertaken by specialist contractors. This relieves the users of the containers (which may formerly contain herbicide) from the responsibility of disposing of them safely.

10 Claims, 3 Drawing Sheets

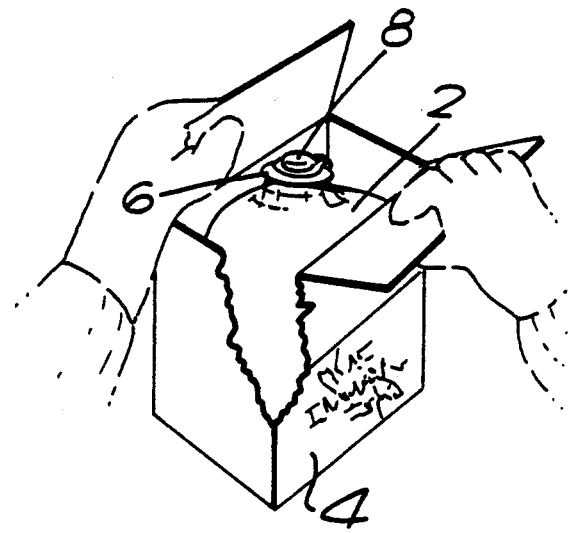
FIG. 1
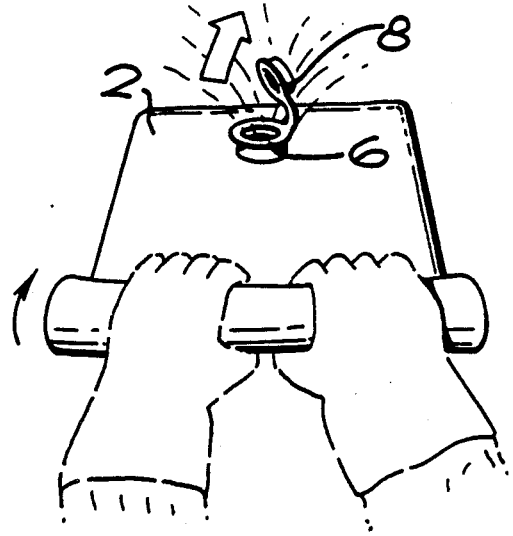
FIG. 2 AIR OUT

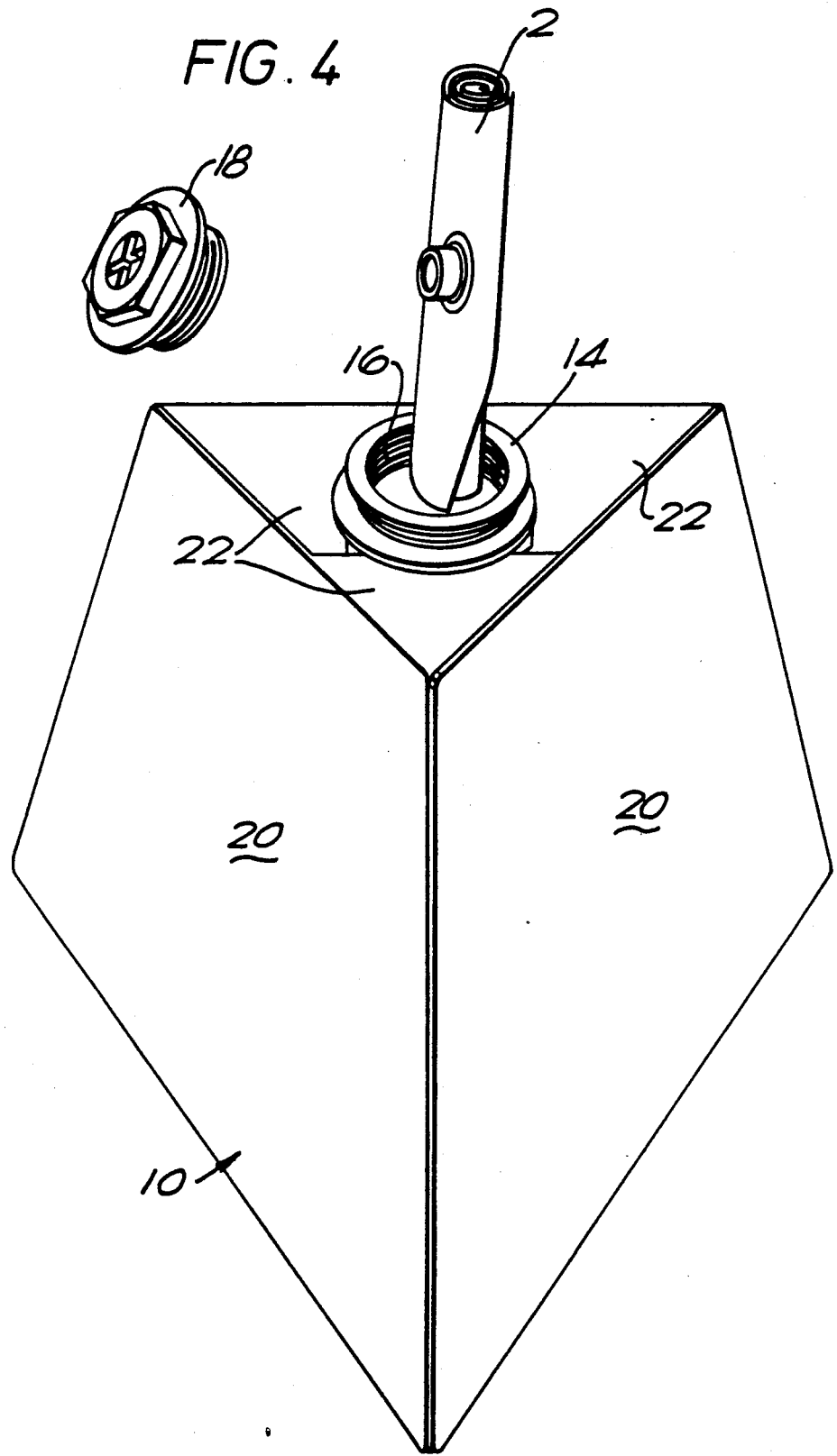

DISPOSAL OF EMPTY CONTAINERS

BACKGROUND OF THE INVENTION

1. Field of the Invention

This invention relates to the disposal of empty containers, particularly, although not exclusively, empty containers which formerly contained hazardous material.

2. Description of the Related Art

It is known to supply herbicide in containers similar to so-called wine boxes, used for dispensing wine. Such containers comprise a flexible inner liner in the form of a bag, made from plastics material, which is accommodated in a rigid outer casing, in the form of a box made from a folded blank of cardboard. The inner liner is provided with an outlet fitting which, in use of the container to dispense its contents, projects through a hole in the wall of the box and is connected to an inlet fitting of herbicide delivery equipment.

Such packaging has proved particularly useful for herbicide formulations which can be dispensed directly from the container, without requiring any dilution.

Herbicides are often toxic to humans and animals, and environmentally hazardous. The disposal in a safe manner of containers which formerly contained herbicides and other hazardous material is a long-standing problem. If such disposal involves difficulty or inconvenience for the user of the hazardous material, there is the danger that the user will be tempted to ignore advice or regulations governing the disposal of such containers, with consequent danger to the public and to the environment. Even where provision is made for the collection of empty containers for specialized disposal, this is economically feasible only if the user has a large number of empty containers for collection, and he is consequently faced with the problem of storing the empty containers in the interval between collections.

SUMMARY OF THE INVENTION

According to the present invention, there is provided a method of disposing of empty containers formerly containing hazardous material, the containers each comprising a rigid outer casing and a flexible inner liner, the method comprising:

a) removing the empty liners from their casings;
b) placing the empty liners in a waste receptacle having a closable insertion aperture;
c) closing the insertion aperture; and
d) disposing of the filled waste receptacle.

The casing of the container will normally not have been contaminated by the contents of the flexible inner liner, and so can be disposed of conventionally. For added safety, however, the casing can be disposed of by being burnt or buried, but this need not involve specialised techniques, and so can be accomplished by the user of the material from the container.

The waste receptacle may comprise a flexible enclosure provided with a fitting defining the insertion aperture. Closure of the insertion aperture may be achieved by means of a screwthreaded cap engagable within the insertion aperture in a sealing-tight manner. The flexible enclosure may be accommodated in a rigid housing, for example of cardboard material. The housing may be provided with a base for supporting it on the ground, the outlet fitting, if provided, being supported by the housing in the region of the top of the housing.

The waste receptacle provides a convenient means of storing the inner liners of the empty containers until they are collected for specialised disposal, for example by incineration or burying.

The inner liners of the containers are preferably compressed to expel air before they are placed in the waste receptacle. The inner liners may, for example, be rolled up in the direction towards their outlets in order to reduce their size sufficiently far to enable them to be passed easily through the insertion aperture. The size of the insertion aperture may be selected deliberately in order to prevent a user from inserting the inner liners until substantially all air has been expelled from them. Preferably, the inner liners are provided with closable outlet fittings, the outlet fittings being closed before the inner liners are placed in the waste receptacle.

BRIEF DESCRIPTION OF THE DRAWING

For a better understanding of the present invention, and to show how it may be carried into effect, reference will now be made, by way of example, to the accompanying drawings, in which:

FIG. 1 shows a herbicide container, comprising a flexible inner liner and a rigid outer casing, the outer casing being removed from the inner liner;

FIG. 2 shows the inner liner being rolled up to expel air;

FIG. 4 shows an inner liner being inserted into the waste receptacle.

DESCRIPTION OF THE PREFERRED EMBODIMENTS

Figure 3:
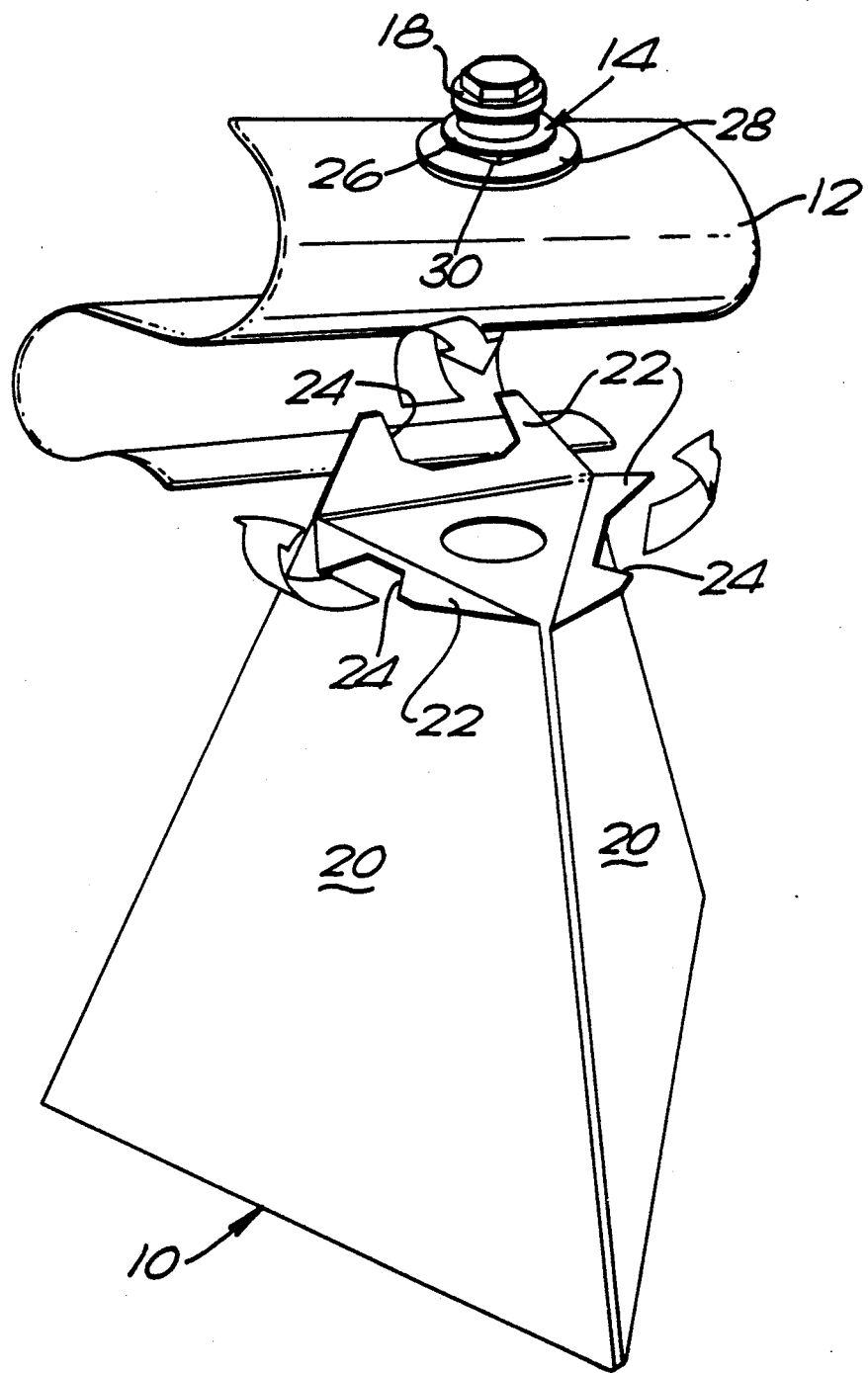
FIG. 3 shows the component parts of a waste receptacle.

Referring to FIG. 1, a herbicide container comprises a flexible inner liner 2, for example of metallised plastics film, accommodated within a rigid outer casing 4, formed from a folded blank of stiff material such as cardboard. The inner liner 2 has an outlet fitting 6 through which the herbicide flows into and out of the container. A captive cap 8 is provided for closing the outlet fitting 6 when the container is not being used to dispense the herbicide. In normal use, the outlet fitting 6 projects through a wall of the outer casing 4 for connection to an inlet fitting of herbicide delivery equipment.

The flexible inner liner 2 is accommodated freely within the outer casing 4; in other words, it is not secured to the outer casing 4 except by the engagement of the outlet fitting 6 within the hole in the wall of the casing 4. As shown in FIG. 1, when the inner liner 2 is empty, the outer casing 4 can be torn open and removed from the inner liner 2 for disposal by conventional means. The inner liner 2, however, will be contaminated with residues of the herbicide, and consequently must be disposed of in a specialised manner in order to avoid harmful consequences.

As shown in FIG. 2, the inner liner 2, after removal of the outer casing 4, is rolled up in the direction towards the outlet fitting 6, with the cap 8 released, in order to expel any air remaining in the liner 2 and to reduce its size so that it can be inserted into a waste receptacle, described with reference to FIGS. 3 and 4. Once the air is expelled, the cap 8 is replaced.

FIG. 3 shows the components of the waste receptacle. The receptacle comprises an outer casing 10, made from a folded blank of material such as corrugated cardboard. A flexible enclosure 12, for example of the same material as the inner liner 2 of the container, is accommodated within the casing 10. The enclosure 12 has an insertion fitting 14 providing an insertion aperture 16 (FIG. 4) which can be closed by a cap 18. For this purpose, the cap 18 is screwthreaded, and engages corresponding internal screwthreads on the insertion aperture 16.

As mentioned, the outer housing 10 is formed from corrugated cardboard to provide a triangular base and three upwardly extending, and inwardly sloping side walls 20. At their top edges, the side walls 20 have closure flaps 22 which have cut-out regions 24. When the closure flaps 22 are folded inwardly, as indicated in FIG. 3, the cut-out regions 24 cooperate to form a non-circular aperture within which the outlet fitting 14 is received. The outlet fitting 14 comprises upper and lower flanges 26 and 28, and a non-circular connecting portion 30. When the waste receptacle is assembled, the closure flaps 22 lie between the flanges 26 and 28, and the recess defined by the cut-out regions 24 closely encloses the connecting region 30. Consequently, as shown in FIG. 4, the outlet fitting 14 is retained in the top wall of the housing 10 in a secure manner. The closure flaps 22 may be secured in their assembled condition by means of an adhesive.

In a preferred embodiment, the height of the waste receptacle 10 is approximately 60 cm, and the length of each side wall 20 at the base is approximately 55 cm. The diameter of the outlet aperture 16 is preferably greater than 5 cm and less and 15 cm, for example approximately 9 cm. This enables the inner liner 2 to be inserted easily in the rolled configuration as shown in FIG. 4, but makes it difficult to insert the inner liner 2 before it is rolled up. Furthermore, it is impossible to insert the entire container, including the outer casing 4.

In use, the waste receptacle would be supplied to a herbicide user, who would situate it at a convenient place on his premises, so that, as each herbicide container is emptied, it can be broken into its components as shown in FIG. 1, and the inner liner 2 can be deposited in the receptacle 10, as shown in FIG. 4. When the receptacle 10 is full, it is closed in a sealing-tight manner by the cap 18, and the user can arrange for a specialised disposal contractor to collect the filled receptacle 10. The contractor then removes the filled receptacle 10, leaving in its place a new, empty one, and the filled receptacle 10 can be disposed of in accordance with requirements laid down for the particular material previously contained in liners 2. For example, the receptacle 10, with its contents, can be incinerated or buried. The herbicide user is thus relieved of the obligation to attend personally to the disposal of the empty container, and yet is not required to devote a large space to the storage of empty containers.

I claim:

1. A method of disposing of empty containers formerly containing hazardous material, the containers each comprising a rigid outer casing and a flexible inner liner with outlet, the method comprising:
    a) removing the empty liners from their casings;
    b) placing empty liners in a waste receptacle having an insertion aperture which is closable by a closure element;
    c) fitting the closure element to the insertion aperture of the waste receptacle to close the insertion aperture; and
    d) disposing of the filled waste receptacle.

2. A method as claimed in claim 1, in which the rigid casings are disposed of separately from the liners.

3. A method as claimed in claim 1, in which the waste receptacle comprises a flexible enclosure provided with a fitting defining the insertion aperture.

4. A method as claimed in claim 3, in which the waste receptacle further comprises a rigid housing which accommodates the flexible enclosure.

5. A method as claimed in claim 4, in which the housing is provided with a base for supporting it on the ground, the fitting defining the insertion aperture being supported by the housing in the region of the top of the housing.

6. A method as claimed in claim 1, in which the closure element comprises a screwthreaded cap engageable within the insertion aperture in a sealing-tight manner.

7. A method as claimed in claim 1, in which the empty liners of the containers are compressed to expel air before they are placed in the waste receptacle.

8. A method as claimed in claim 7, in which the inner liners are rolled up in the direction towards their outlets in order to reduce their size sufficiently far to enable them to be passed through the insertion aperture.

9. A method as claimed in claim 7, in which the size of the insertion aperture is such as to prevent a user from inserting the inner liners until substantially all air has been expelled from them.

10. A method as claimed in claim 1, in which the inner liner outlets are provided with closable outlet fittings, the outlets being closed with the outlet fittings before the inner liners are placed in the waste receptacle.

* * * * *